(12) United States Patent
Kashiwazaki

(10) Patent No.: US 7,684,069 B2
(45) Date of Patent: Mar. 23, 2010

(54) DOCUMENT MANAGEMENT SYSTEM, DOCUMENT MANAGEMENT METHOD, AND PROGRAM FOR IMPLEMENTING THE METHOD

(75) Inventor: Masami Kashiwazaki, Kanagawa (JP)

(73) Assignee: Canon Kabushiki Kaisha (JP)

(*) Notice: Subject to any disclaimer, the term of this patent is extended or adjusted under 35 U.S.C. 154(b) by 802 days.

(21) Appl. No.: 10/758,295

(22) Filed: Jan. 15, 2004

(65) Prior Publication Data

US 2004/0212826 A1    Oct. 28, 2004

(30) Foreign Application Priority Data

Jan. 16, 2003  (JP)  ............... 2003-008443

(51) Int. Cl.
*G06F 3/12*  (2006.01)
*G06F 7/00*  (2006.01)

(52) U.S. Cl. .............. 358/1.15; 358/403; 358/404; 382/100; 382/182; 382/305; 707/1; 707/104.1; 707/206

(58) Field of Classification Search .............. 707/104.1, 707/206, 1–10; 382/100, 182, 305; 358/403, 358/404, 1.15; 709/206; 715/752
See application file for complete search history.

(56) References Cited

U.S. PATENT DOCUMENTS

| | | | | |
|---|---|---|---|---|
| 5,465,353 A | * | 11/1995 | Hull et al. ................. | 707/5 |
| 5,502,576 A | * | 3/1996 | Ramsay et al. ............. | 358/444 |
| 5,530,520 A | * | 6/1996 | Clearwater ................. | 399/366 |
| 5,671,282 A | * | 9/1997 | Wolff et al. ............... | 713/179 |
| 5,754,711 A | * | 5/1998 | Shimizu et al. ............ | 382/305 |
| 5,781,901 A | * | 7/1998 | Kuzma ...................... | 707/10 |
| 5,826,269 A | * | 10/1998 | Hussey ..................... | 707/10 |
| 5,893,908 A | * | 4/1999 | Cullen et al. .............. | 707/5 |
| 5,905,783 A | | 5/1999 | Tonegawa | |
| 6,285,995 B1 | * | 9/2001 | Abdel-Mottaleb et al. .... | 707/3 |

(Continued)

FOREIGN PATENT DOCUMENTS

EP       465818 A2    1/1992

(Continued)

OTHER PUBLICATIONS

Lopresti, Daniel P., "Models and Algorithms for Duplicate Document Detection," Document Analysis and Recognition, 1999; Proceeding of the Fifth Int'l Conf.

(Continued)

*Primary Examiner*—King Y Poon
*Assistant Examiner*—Richard Z Zhu
(74) *Attorney, Agent, or Firm*—Rossi, Kimms & McDowell LLP

(57) ABSTRACT

A document management system is provided which makes it possible to easily obtain original electronic document data of a printed material from the printed material. The document management system is arranged such that a host computer, an image information processing apparatus, and a document management server which manages electronic document data are connected to each other on a network. In the image information processing apparatus, a reader section reads image information, a printer section outputs the read image information and print data output from the host computer, a document searching section searches the electronic document data within the document management server for original electronic document data corresponding to electronic document data within the read image information, and a controller notifies a search result.

11 Claims, 15 Drawing Sheets

U.S. PATENT DOCUMENTS

| | | | |
|---|---|---|---|
| 6,324,555 B1 * | 11/2001 | Sites | 715/234 |
| 6,330,573 B1 * | 12/2001 | Salisbury et al. | 715/234 |
| 6,505,237 B2 * | 1/2003 | Beyda et al. | 709/206 |
| 6,522,770 B1 * | 2/2003 | Seder et al. | 382/100 |
| 6,539,373 B1 * | 3/2003 | Guha | 707/3 |
| 6,631,495 B2 | 10/2003 | Kato et al. | |
| 6,694,316 B1 * | 2/2004 | Langseth et al. | 707/10 |
| 6,970,908 B1 * | 11/2005 | Larky et al. | 709/206 |
| 7,099,490 B1 * | 8/2006 | Fujita et al. | 707/104.1 |
| 7,130,864 B2 * | 10/2006 | Lin et al. | 707/104.1 |
| 7,133,897 B1 * | 11/2006 | Tran | 709/206 |
| 7,136,180 B2 * | 11/2006 | Utsunomiya | 709/206 |
| 7,149,980 B1 * | 12/2006 | Nelson et al. | 715/764 |
| 7,370,079 B2 * | 5/2008 | Murata et al. | 709/206 |
| 7,447,743 B1 * | 11/2008 | Jordan, Jr. | 709/206 |
| 2002/0051011 A1 | 5/2002 | Goto | |
| 2002/0164053 A1 * | 11/2002 | Seder et al. | 382/100 |

FOREIGN PATENT DOCUMENTS

| | | |
|---|---|---|
| EP | 0 980 178 A2 | 2/2000 |
| JP | 10-247195 A | 9/1998 |
| JP | 11-3352 A | 1/1999 |
| JP | 2002-139324 A | 5/2002 |
| JP | 2002-197100 A | 7/2002 |
| WO | 99/56460 A1 | 11/1999 |
| WO | WO 01/48682 A1 | 7/2001 |

OTHER PUBLICATIONS

On Bangalore, India Sep. 20-22, 1999, IEEE Comput. Soc, USA, Sep. 20, 1999, pp. 297-300, Los Alamitos, CA ISBN: 0-7695-0318-7.

"Xerox Office Software Suite FlowPort Version 2.1.1," Xerox Corporation, Feb. 2001, four pages.

Extended European Search Report of Corresponding European Application 04250049.6-2201, dated Apr. 12, 2005.

Extended Search Report, dated Sep. 26, 2008, issued in corresponding EP application No. 04250049.6-2201.

* cited by examiner

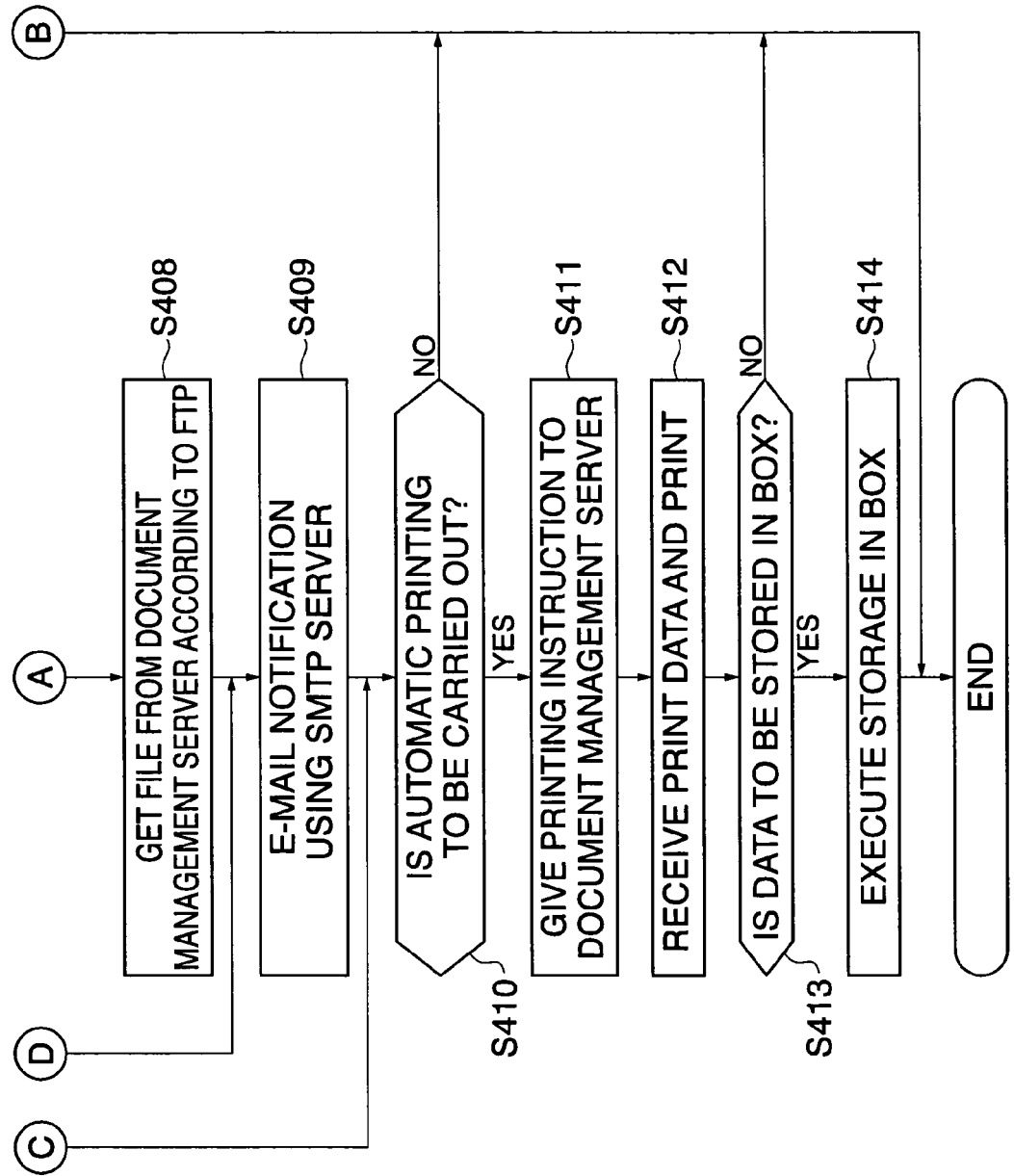

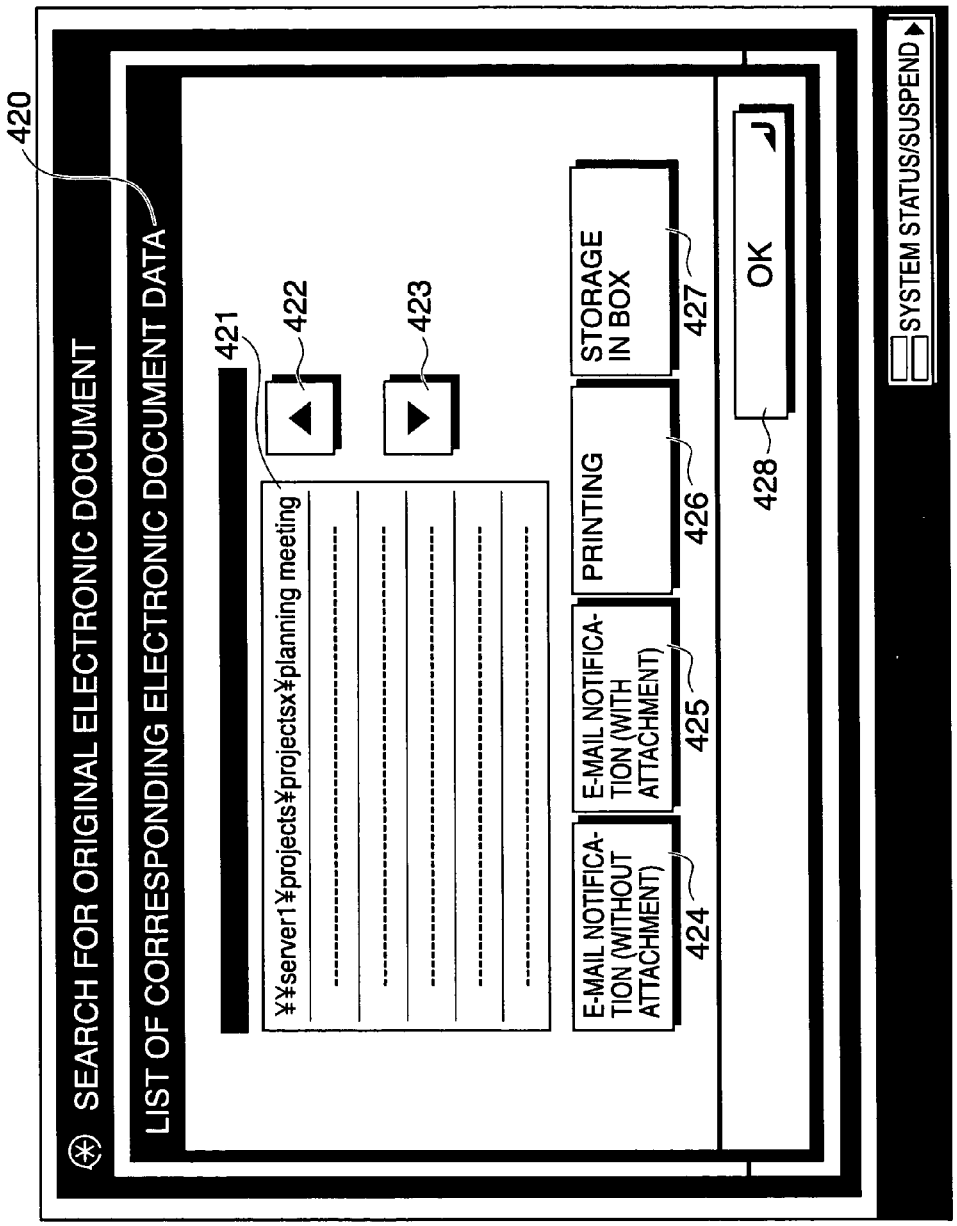

FIG. 9

SENDER : IR3250-28F@canon.co.jp ~461

DESTINATION : yamada.taro@canon.co.jp ~462

SUBJECT : ORIGINAL ELECTRONIC DOCUMENT DATA SEARCH RESULT ~463

DATE : 2001/12/15   17:31:26 ~464

===

THIS E-MAIL IS TO NOTIFY YOU OF ORIGINAL ELECTRONIC DOCUMENT SEARCH RESULT

DOCUMENT YOU HAVE SCANNED CORRESPONDS TO
\\server1\projects\projectsX\planning meeting document\document1.doc ~465
WITHIN DOCUMENT MANAGEMENT SERVER

=============================== ~466

DEVICE NAME:  IR3250
LOCATION:   NEAR DOOR ON 28TH FLOOR OF BLOCK A
===============================

DOCUMENT 1.doc ~467

FIG. 10

SENDER : IR3250-28F@canon.co.jp ~471

DESTINATION : yamada.taro@canon.co.jp ~472

SUBJECT : ORIGINAL ELECTRONIC DOCUMENT DATA SEARCH RESULT ~473

DATE : 2001/12/15   17:31:26 ~474

= = =

THIS E-MAIL IS TO NOTIFY YOU OF ORIGINAL ELECTRONIC DOCUMENT SEARCH RESULT

DOCUMENT YOU HAVE SCANNED CORRESPONDS TO MULTIPLE DOCUMENTS WITHIN DOCUMENT MANAGEMENT SERVER. CORRESPONDING DOCUMENTS ARE LISTED SO THAT DOCUMENT DETERMINED CLOSEST IS AT THE TOP

¥¥server1¥projects¥projectsX¥planning meeting document1¥document1.doc ~475
¥¥server1¥projects¥projectsY¥planning meeting document¥document2.doc ~476
¥¥server1¥use¥yamada¥work¥documenttmp.doc ~477

========================= ~478

DEVICE NAME:   IR3250
LOCATION:   NEAR DOOR ON 28TH FLOOR OF BLOCK A
=========================

FIG. 11

SENDER : IR3250-28F@canon.co.jp ~481

DESTINATION : yamada.taro@canon.co.jp ~482

SUBJECT : ORIGINAL ELECTRONIC DOCUMENT DATA SEARCH RESULT ~483

DATE : 2001/12/15  17:31:26 ~484

= = =

THIS E-MAIL IS TO NOTIFY YOU OF ORIGINAL ELECTRONIC DOCUMENT SEARCH RESULT

DOCUMENT YOU HAVE SCANNED IS NOT FOUND ~485
WITHIN DOCUMENT MANAGEMENT SERVER.

===================================== ~486
DEVICE NAME:  IR3250
LOCATION:  NEAR DOOR ON 28TH FLOOR OF BLOCK A
=====================================

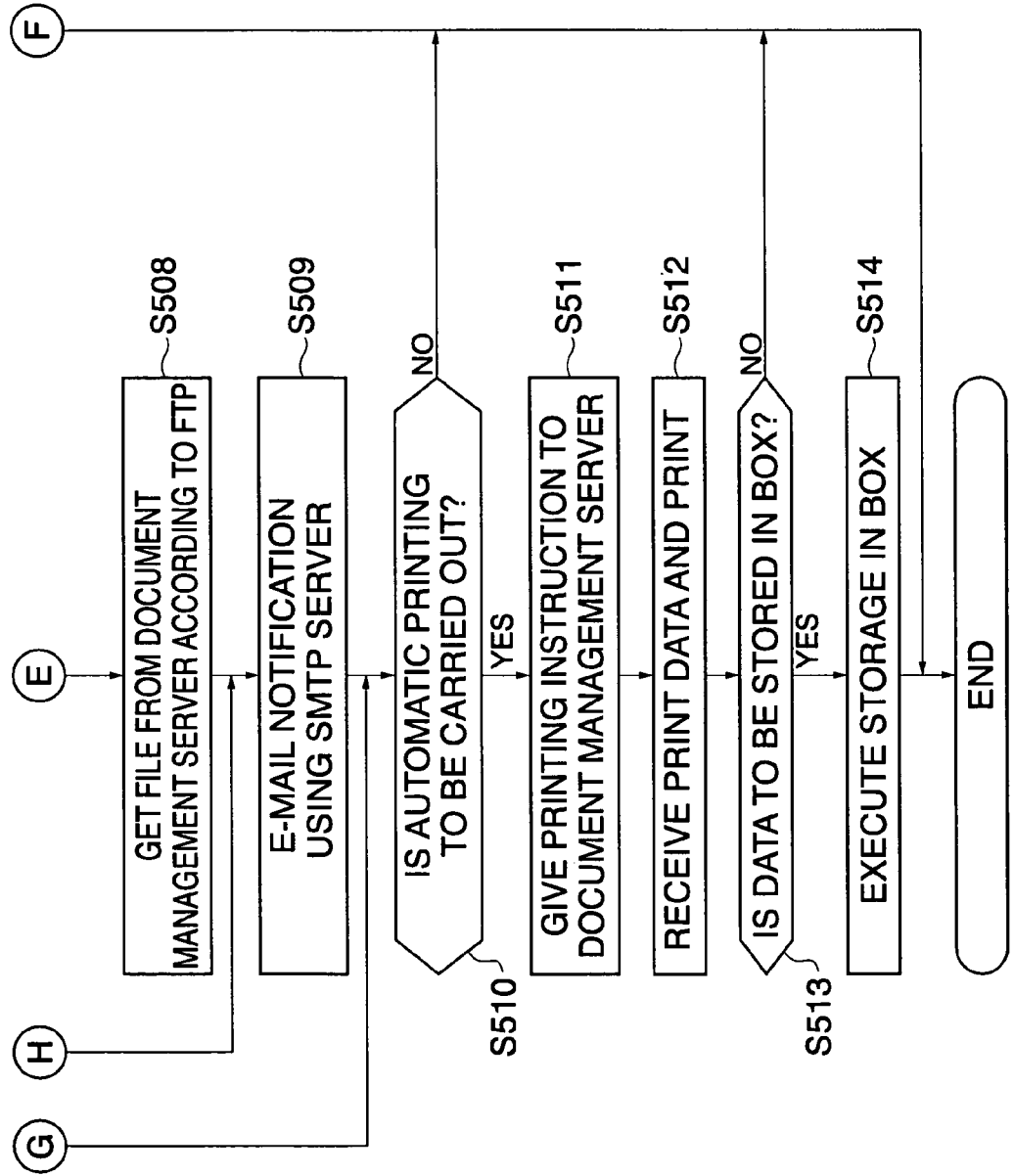

DOCUMENT MANAGEMENT SYSTEM, DOCUMENT MANAGEMENT METHOD, AND PROGRAM FOR IMPLEMENTING THE METHOD

BACKGROUND OF THE INVENTION

1. Field of the Invention

The present invention relates to a document management system in which a document management server and a digital multi-function machine or the like are connected to each other on a network, and a document management method as well as a program for implementing the method, and more particularly to a document management system and a document management method in which, according to an original image of a printed material obtained from a digital multi-function machine or the like, original electronic document data as a basis of the original image is searched for within a document management server and the search result is notified to the user, as well as a program for implementing the method.

2. Description of the Related Art

Conventionally, it has been often the case that a user of a document management system needs to obtain original electronic document data of a printed material based on electronic original data or the like, from the printed material.

However, to find the actual location of original electronic document data of a printed material when obtaining the original electronic document data, the user has to check the contents of electronic document data stored in a document management server one by one, or has to inquire a person who has created or printed the printed material for the location of the original electronic document data. This is troublesome for the user, and raises the problem of low working efficiency.

SUMMARY OF THE INVENTION

It is an object of the present invention to provide a document management system and a document management method which make it possible to easily obtain original electronic document data of a printed material from the printed material, as well as a program for implementing the method.

To attain the above object, in a first aspect of the present invention, there is provided a document management system comprising a host computer, an image information processing apparatus, a document management server that manages electronic document data, and a network that connects the host computer, the image information processing apparatus, and the document management server to each other, and the image information processing apparatus comprises an image information reading device that reads image information, an output device that outputs the image information read by the image information reading device and print data output from the host computer, a searching device that searches the electronic document data within the document management server for original electronic document data corresponding to electronic document data within the read image information, and a notifying device that notifies a result of search by the searching device.

According to the first aspect of the present invention, just by reading image information of a printed material using the image information processing apparatus, original electronic document data corresponding to electronic document data contained in the image information can be searched out from electronic document data within the document management server, and the result of search can be notified to the user. As a result, the burden imposed on the user in searching for original electronic document data is reduced, whereby original electronic document data of a printed material can be easily obtained from the printed material.

Preferably, the searching device comprises a character recognition device.

According to this arrangement, the image information processing apparatus searches for original electronic document data using text information extracted by the character recognition device. As a result, it is possible to search for original electronic document data in an effective manner if image information includes text information.

Preferably, the searching device comprises a watermarked information sensing device.

According to this arrangement, the image information processing apparatus searches for original electronic document data using watermarked information which has been watermarked in advance during printing of image information. As a result, it is possible to search for original electronic document data with high accuracy for various types of image information.

Preferably, the notifying device transmits the result of search as an electronic mail to an electronic mail address registered in the image information processing apparatus.

According to this arrangement, the user can receive the result of search for original electronic document data as an electronic mail, and hence he/she does not have to e.g. make a note of the search result.

Preferably, the image information processing apparatus comprises an operating section, and the notifying device displays the result of search in the operating section.

According to this arrangement, the result of search for original electronic document data is displayed in the operating section, and hence the user can visually recognize the search result at once.

Preferably, the notifying device transmits an electronic mail with a file of the corresponding original document data attached thereto to an electronic mail address registered in the image information processing apparatus.

According to this arrangement, the user can receive the result of search for original electronic document data as an electronic mail with original electronic document data corresponding to image information attached thereto, and hence he/she can obtain desired electronic document data by a simple operation as in the case where he/she handles an ordinary electronic mail.

Preferably, the result of search includes storage location information indicative of a location where the corresponding original electronic document data is stored.

According to this arrangement, information indicative of a location where desired electronic document data is stored within the document management server is included in the result of search for original electronic document data, and hence the user can access his/her desired electronic document data within the document management server according to the information.

Preferably, in a case where a plurality of original electronic document files corresponding to the electronic document data within the output image information are searched out, the result of search includes correspondence information indicative of priorities assigned to the plurality of original electronic document files according to degrees of correspondence.

According to this arrangement, information indicative of the degrees of correspondence, i.e. priorities assigned to a plurality of original electronic document files according to the degrees of correspondence is included in the result of search for original electronic c document data, and hence the user can use electronic document data by giving priority to an original electronic document data file closest to the original electronic document data.

Preferably, the image information processing apparatus comprises a printing device and a controller operable when original electronic document data corresponding to the electronic document data within the read image information is present within the document management server, to cause the printing device to print the original electronic document data.

According to this arrangement, electronic document data corresponding to original electronic document data can be automatically printed by the printing device, and hence the same output as image information without image deterioration can be obtained by a simple operation as in the case of copying.

Preferably, the image information processing apparatus comprises a storage device and a controller operable when original electronic document data corresponding to the electronic document data within the read image information is present within the document management server, to provide control to store data obtained by rendering the original electronic document data in the storage device.

According to this arrangement, electronic document data corresponding to original electronic document data can be stored as rendered information in the storage device, and hence even after original electronic document data is searched for, it is possible to e.g. reprint corresponding electronic document data by executing various functions using the storage device.

To attain the above object, in a second aspect of the present invention, there is provided a document management method for a document management system in which a host computer, an image information processing apparatus, and a document management server which manages electronic document data are connected to each other via a network, comprising an image information reading step of reading image information, an output step of outputting the image information read in the image information reading step and print data output from the host computer, a searching step of searching the electronic document data within the document management server for original electronic document data corresponding to electronic document data within the read image information, and a notifying step of notifying a user of a result of search in the searching step.

To attain the above object, in a third aspect of the present invention, there is provided a computer-readable program for causing a computer to execute a document management method for a document management system in which a host computer, an image information processing apparatus, and a document management server which manages electronic document data are connected to each other via a network, comprising an image information reading module for reading image information, an output module for outputting the image information read by the image information reading module and print data output from the host computer, a searching module for searching the electronic document data within the document management server for original electronic document data corresponding to electronic document data within the read image information, and a notifying module for notifying a user of a result of search by the searching module.

The above and other objects, features, and advantages of the invention will become more apparent from the following detailed description taken in conjunction with the accompanying drawings.

BRIEF DESCRIPTION OF THE DRAWINGS

FIGS. 5A and 5B are flow chart showing an original electronic document data searching process carried out by an image input/output controller 105 of the document management system 10 of FIG. 1;

FIG. 6 is a view showing an example of a screen on a display panel 310 of the operating section 102, which displays the result of a search for original electronic document data in a step S405 in FIG. 5A;

FIG. 9 is a view showing an example of the contents of an e-mail notification in the case where one document data corresponds to original image data as a result of a search for original electronic document data and a setting has been made such that original electronic document data is to be attached to an e-mail;

FIG. 10 is a view showing an example of the contents of an e-mail notification in the case where three document data correspond to original image data as a result of a search for original electronic document data and a setting has been made such that original electronic document data is not to be attached to an e-mail;

FIG. 11 is a view showing an example of the contents of an e-mail notification in the case where there is no electronic document data corresponding to original image data as a result of a search for original electronic document data;

FIGS. 13A and 13B are flow chart showing an original electronic document data searching process carried out by an image input/output controller 105 of the document management system 10 of FIG. 12.

DETAILED DESCRIPTION OF THE PREFERRED EMBODIMENTS

The present invention will now be described in detail with reference to the drawings showing preferred embodiments thereof.

Figure 1:
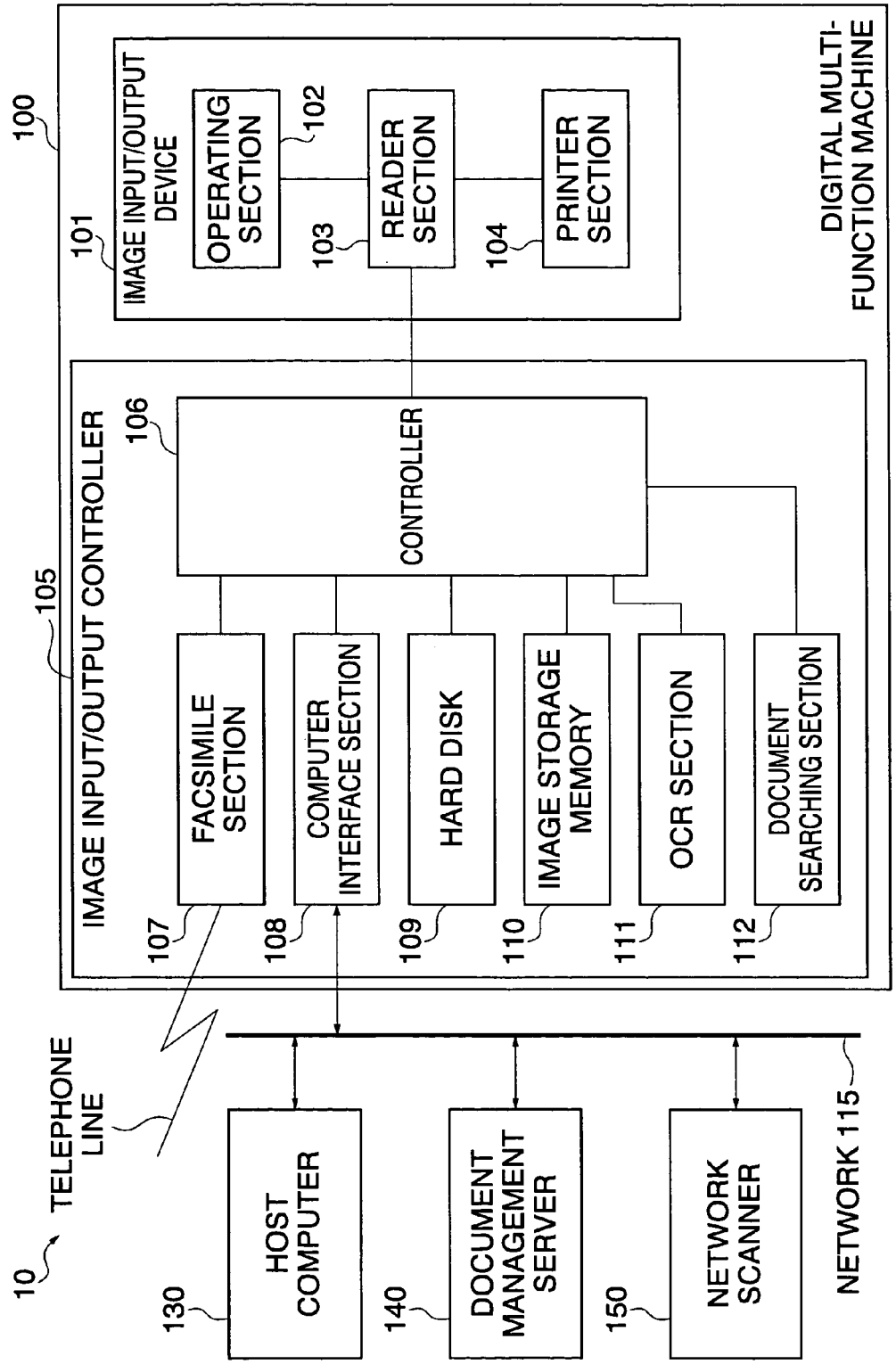
FIG. 1 is a block diagram showing the arrangement of a document management system according to a first embodiment of the present invention.

FIG. 1 is a block diagram showing the arrangement of a document management system according to a first embodiment of the present invention.

In FIG. 1, the document management system 10 is comprised of a digital multi-function machine (image information processing apparatus) 100, a host computer 130, a document management server 140, a network scanner 150, and so forth, which are connected to each other via a network 115, and is intended for converting sheet documents and a plurality of types of electronic documents in different data formats into files in predetermined data formats and storing the same in the document management server 140 to collectively manage various documents. In the management system 10, the host computer 130, the digital multi-function machine 100, and so forth can share electronic document data files to carry out searching, viewing, deleting, copying, transferring, editing, and so forth.

A description will now be given of the construction of the digital multi-function machine 100 with reference to FIGS. 1 to 3.

Figure 2:
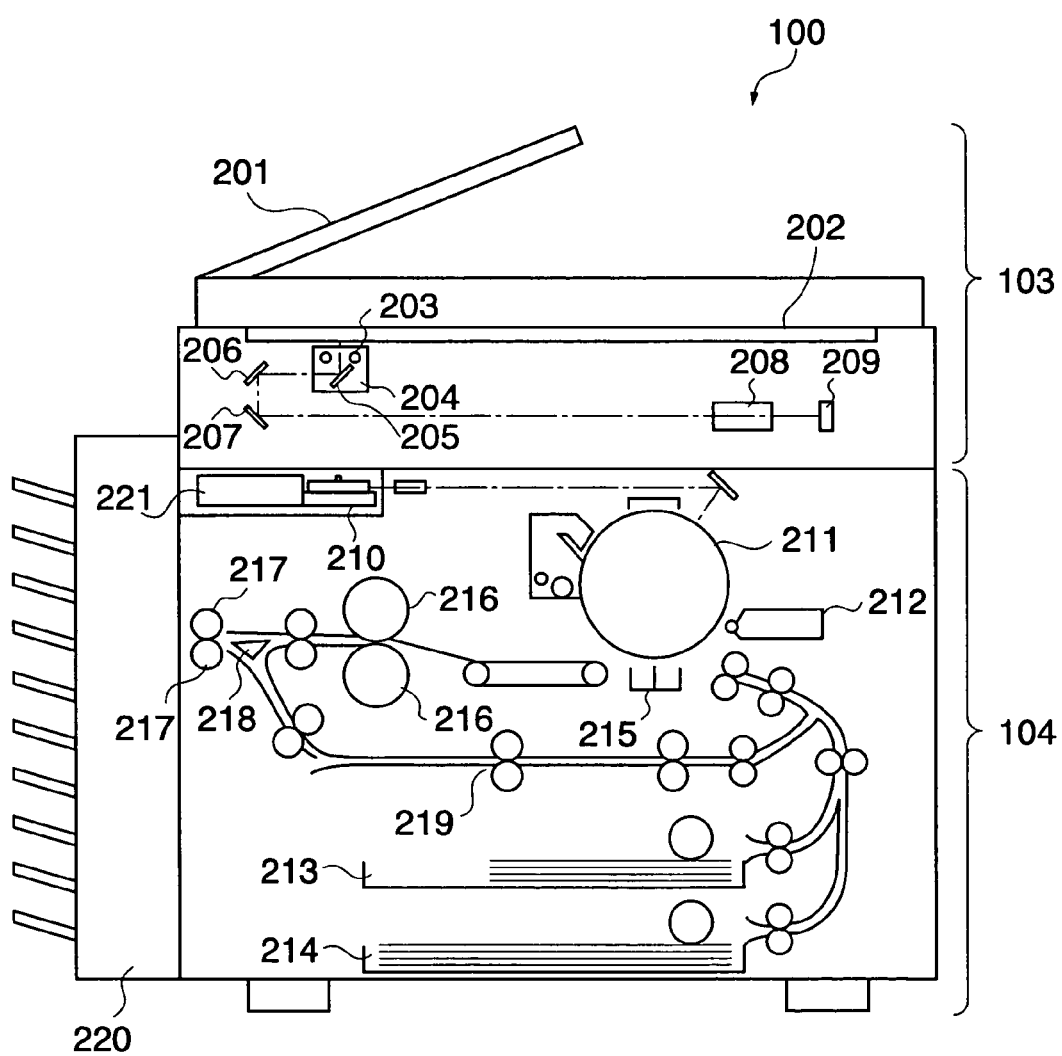
FIG. 2 is a sectional view showing the construction of a digital multi-function machine 100 appearing in FIG. 1.
Figure 3:
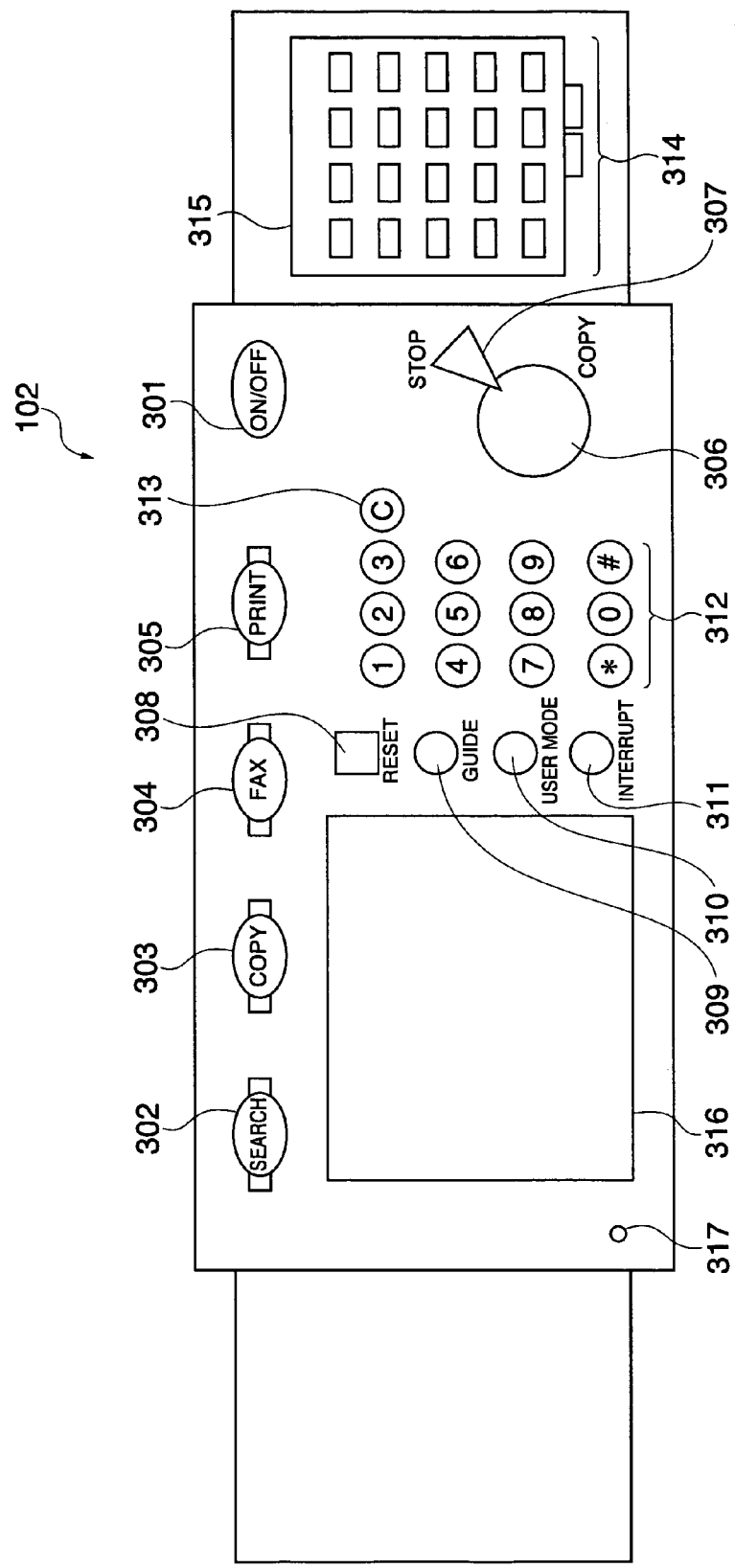
FIG. 3 is a view showing an operating section 102 of the digital copying machine 100 appearing in FIG. 1.

FIG. 2 is a sectional view showing the construction of the digital multi-function machine 100 appearing in FIG. 1, and FIG. 3 is a view showing an operating section 102 of the digital copying machine 100 appearing in FIG. 1.

As shown in FIG. 1, the digital multi-function machine 100 is an image information processing apparatus which is configured as an integral unit having functions of a plurality of machines such as a copying machine, a printer, and a facsimile. The digital multi-function machine 100 includes an image input/output device 101 which reads and prints images, and an image input/output controller 105 which controls the image input/output device 101.

The image input/output device 101 is comprised of the operating section 102 which inputs information for operating the image input/output device 101 and the image input/output device controller 105, a reader section 103 which reads an image on an original (original image) and outputs image data corresponding to the original image to the image input/output controller 105, and a printer section 104 (output means) which prints an image based on the image data.

The image input/output controller 105 is connected to the reader section 103, and includes a controller 106, a facsimile section 107, a computer interface section 108, a hard disk 109, an image storage memory 110, an OCR (Optical Character Reader) section 111, and a document searching section 112.

The controller 106 controls the flow of data between the reader section 103, facsimile section 107, computer interface section 108, hard disk 109, image storage memory 110, OCR section 111, and document searching section 112.

The image data output from the image input/output device 101 to the image input/output device 105 is temporarily stored in the hard disk 109 or the image storage memory 110 under the control of the controller 106. The temporarily stored image data is taken out by the image input/output device 101 under the control of the controller 106, and the printer section 104 records an image corresponding to the image data on a recording sheet. On this occasion, if no setting has been made to output image data again, the image data taken out from the hard disk 109 or the image storage memory 110 is deleted from the hard disk 109 or the image storage memory 110.

The facsimile section 107 receives compressed image data via a telephone line, expands the compressed image data, and then transfers the expanded image data to the controller 106. Also, the facsimile section 107 compresses image data transferred form the controller 106, and transmits compressed image data via a telephone line. The expanded image data can be temporarily stored in the hard disk 109 or the image storage memory 110.

The computer interface section 108 is connected to the host computer 130 via the network 115 and a host interface, not shown, such as a Centronics interface. The computer interface section 108 receives code data (PDL: Page Description Language) representing an image to be printed from the host computer 103 and image data from the network scanner 150 connected to the computer interface section 108 via the network 115, and expands them into image data which can be recorded by the printer section 104. The expanded image data is recorded in the hard disk 109 or the image storage memory 110 under the control of the controller 106.

The OCR section 111 is capable of performing OCR processing on image data read by the reader section 103, and converting the same from image information into text information. The document searching section 112 searches for the same electronic document data as electronic document data within original image data read by the reader section 103 according to text information obtained by OCR processing.

As shown in FIG. 2, the reader section 103 includes an original feeder 201, which feeds originals sheet by sheet onto a platen glass, and discharges each original on the platen glass 202 after reading an image thereon. When each original is conveyed to the platen glass 202, a scanner unit 204 having a lamp 203 turns on the lamp 203 and starts moving to scan the original. Light reflected from the original is led to a CCD image sensor (hereinafter abbreviated as "CCD") 209 via optical elements such as mirrors 205, 206, and 207 and a lens 208. In this way, an image on the scanned original is read by the CCD 209. The image data output from the CCD 209 is subjected to predetermined processing and then transferred to the controller 106 of the image input/output controller 105 appearing in FIG. 1.

The printer section 104 includes a laser-emitting section 210 which is driven by a laser driver 221. Specifically, the laser driver 221 causes the laser emitting section 210 to emit laser light according to image data output from the image input/output controller 105. The laser light is irradiated upon a surface of a photosensitive drum 211, so that a latent image is formed on the surface of the photosensitive drum 211. A developer supplied by a developing unit 212 is attached to the surface of the photosensitive drum 211 where the latent image is formed. In timing synchronous with the start of laser light irradiation, a recording sheet is fed from a cassette 213 or a cassette 214, which contains recording sheets, and is conveyed to a transfer section 215, and an image developed by the developer attached to the photosensitive drum 211 (hereinafter referred to as "the developed image") is transferred onto the recording sheet.

The recording sheet with the developed image transferred thereon is conveyed to a fixing section 216, which fixes the developed image to the recording sheet by heating and pressurizing. The recording sheets having passed the fixing section 216 are discharged by a pair of discharging rollers 217, and a sorter 220 stores the recording sheets in respective pins, sorts them, and staples the sorted recording sheets. It should be noted that the sorter 220 stores recording sheets with images formed thereon in a top pin in the case where a sort mode is not set.

In the case where a double-sided recording mode is set, a recording sheet is conveyed to the discharging rollers 217, and the rotational directions of the discharging rollers 217 are reversed, so that the recording sheet is led to a sheet reefed conveying section 219. In the case where a multi-recording mode is set, a recording sheet is led to a sheet refeed conveying path 219 by operation of a flapper 218, so that the recording sheet is inhibited from being conveyed to the discharging rollers 217. The recording sheet led to the sheet refeed conveying path 219 is fed again to the transfer section 215 in the above described timing.

As shown in FIG. 3, the operating section 102 includes operation keys for various operations and a display panel. A lamp 301 which also serves as a power switch is turned on only when power supply is turned on. A main power switch, not shown, for controlling energization of the main body of the digital multi-function machine 100 is disposed on a side surface of the main body.

Reference numeral 302 denotes a search key which is used to select a function of searching original electronic document data of an original image read by the reader section 103 among a plurality of functions of the digital multi-function machine 100. Reference numeral 303 denotes a copy mode key which is used to select a copying function from the plurality of functions. Reference numeral 304 is a facsimile mode key which is used to select a facsimile function from among the plurality of functions. Reference numeral 305 denotes a print key which is used to select a printer function from among the plurality of functions and display a printing status on a display panel 316.

Reference numeral 306 denotes a copy start key which is used to give an instruction for starting copying or reading an original image. Reference numeral 307 denotes a stop key which is used to stop or suspend copying or original image reading. Reference numeral 308 denotes a reset key which has a function of returning to a standard mode on standby. Reference numeral 309 denotes a guide key which is used to guide the user on each function. Reference numeral 310 denotes a user mode key which is used for the user to change basic system settings.

Reference numeral 311 denotes an interrupt key which is used to interrupt a sequence of copying operations so as to carry out other copying. Reference numeral 312 denotes a ten-key which is used to enter numeric values. Reference numeral 313 denotes a clear key which is used to clear input numeric values. Reference numeral 314 denotes twenty one-touch dial keys having a function of dialing a destination's number with a single touch of a button according to a user's setting when data is transmitted via facsimile.

Reference numeral 315 denotes a pair of plate-shaped covers which overlap one upon the other, and are disposed upon the one-touch dial key 314. A base member on which the one-touch dial key 314 and the covers 315 are mounted is hollowed at a portion thereof on which the key 314 and covers 315 overlap. Whether the two covers 315 are opened or not is detected by a sensor switch, not shown. Specifically, the following three states are detected: a first state in which the two covers 315 are both closed, a second state in which only the first one of the two covers 315 is opened (lifted), and a third state in which the two covers 315 are both opened (lifted). FIG. 3 shows the first state. The operations of the one-touch dial keys 314 are specified in combination with the three states of the two covers 315, and hence the same effects can be obtained as in the case where 20×30=60 keys are provided.

Reference numeral 316 denotes a display panel which is comprised of a liquid crystal screen and a touch sensor. On the display panel 316, setting screens are displayed according to respective functions selected using the above described respective mode keys, and various detailed settings can be made by touching displayed keys. Reference numeral 317 denotes a warm-up key which is used to turn on/off a warm-up mode.

Figure 4:
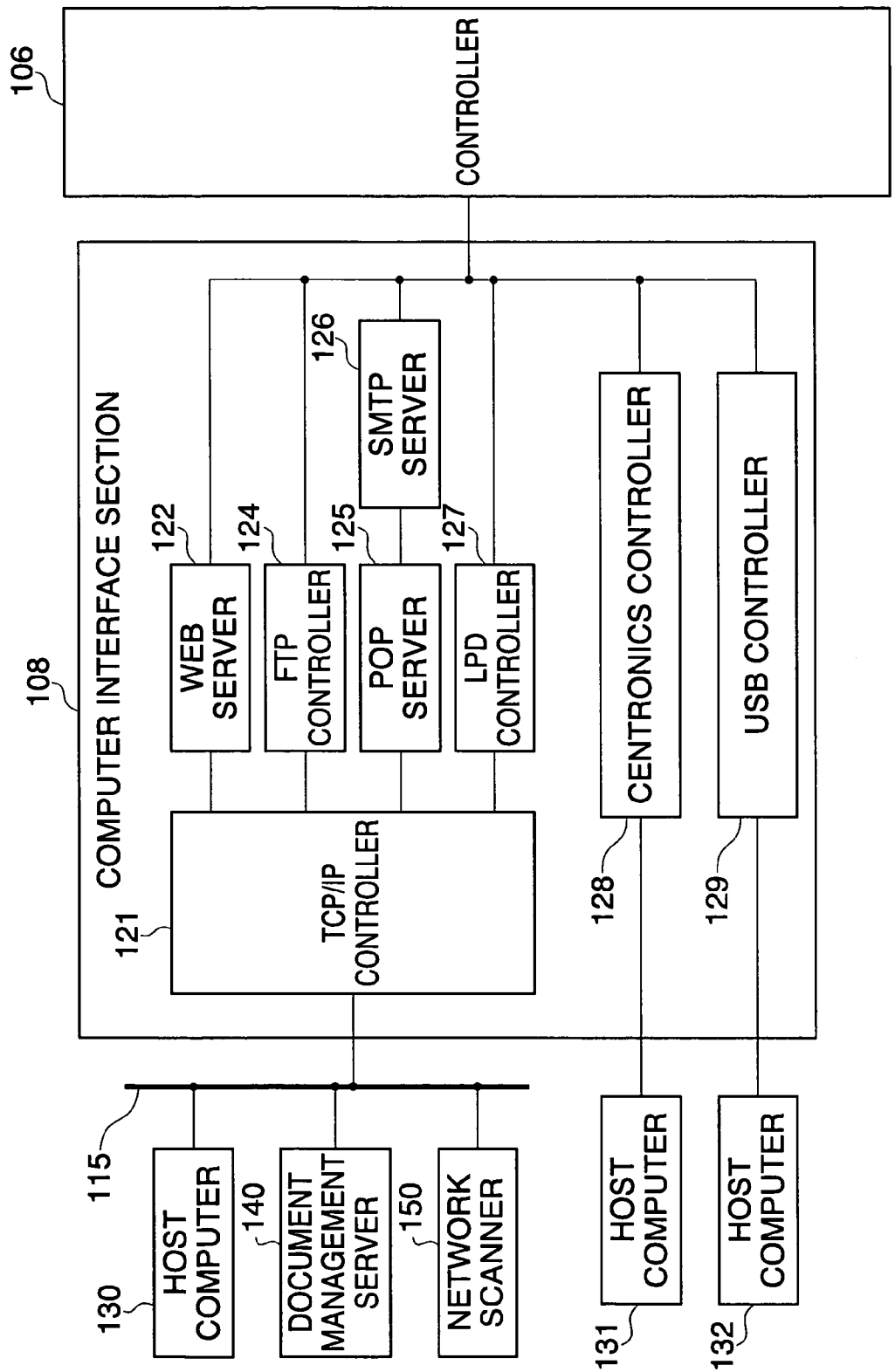
FIG. 4 is a block diagram showing the arrangement of a computer interface section 108 appearing in FIG. 1.

FIG. 4 is a block diagram showing the construction of the computer interface section 108 appearing in FIG. 1. The computer interface section 108 includes an Ethernet (registered trademark) interface which provides interface for network connection, a Centronics interface which provides interface for directly connecting to a host computer, and a USB interface.

A TCP/IP (Transmission Control Protocol/Internet Protocol) controller 121 is connected to the host computer 130, document management server 140, network scanner 150, and so forth via the Ethernet (registered trademark) interface, and carries out network communication according to TCP/IP. A Web server 122 is capable of sending and receiving HTML (Hyper Text Markup Language) files in accordance with instructions from the controller 106. The Web server 122 designates an IP address of the digital multi-function machine 100 through a browser application, not shown, operating on the host computer 130 or the like connected to the Web server 122 via the network 115, thus displaying the status of the digital multi-function machine 100 and e.g. displaying and changing various environmental settings.

Reference numeral 124 denotes an FTP (File Transfer Protocol) controller which is capable of sending and receiving files via the network 115 in accordance with instructions from the controller 106. A POP (Post Office Protocol) server 125 and an SMTP (Simple Mail Transfer Protocol) server 126 are capable of sending and receiving electronic mails (hereinafter abbreviated as "e-mails") via the network 115 in accordance with instructions from the controller 106. An LPD controller 127 is a printing application operating on TCP/IP, for receiving print data transmitted from an LPR client via the network 115 and transmitting various kinds of information relating to the digital multi-function machine 100 to, the LPR client. The data received by the LPD controller 127 is transferred to the controller 106 and then printed.

Reference numeral 128 denotes a Centronics controller which is connected to a host computer 131 via a Centronics cable, for receiving print data and transmitting various kinds of information relating to the digital copying machine 100 to the host computer 131. Reference numeral 129 denotes a USB controller which is connected to a host computer 132 via a USB cable, for receiving print data and transmitting various kinds of information relating to the digital copying machine 100 to the host computer 132.

A description will now be given of how to search for original electronic document data according to the present embodiment.

In the document management system 10, original electronic document data of an original image read by the reader section 103 is searched for within the document management server 140, and the search result is notified to the user in a variety of ways.

The image data of an original read by the reader section 103 of the digital multi-function machine 100 is output to the image input/output controller 105, and then temporarily stored in the hard disk 109 or the image storage memory 110 under the control of the controller 106. The read image data is subjected to OCR processing by the OCR section 111, and converted from image data to text data.

The document searching section 112 compares the text data obtained by the OCR processing with text data in electronic document data files within the document management server 140 to check whether or not there is any electronic document data which is identical with the read original image. If there is electronic document data which is identical with the read original image, the controller 106 provides control to display information about e.g. the location of the electronic document data on the touch panel 316 of the operating section 102. The user gives an instruction by operating the touch panel 316 so as to send a notification of the search result by e-mail to an e-mail address registered in advance, cause the document management server 140 to instruct the digital multi-function machine 100 to print the search result, or register information indicative of the search result as image information in a box within the hard disk 109 of the digital multi-function machine 100. It should be noted that the above described e-mail notification, execution of printing, execution/non-execution of storage in a box, and so forth may be set in advance using the operating section 102 of the digital multi-function machine 102 or management software "Remote UI", described later, so that the settings can be automatically executed.

Figure 5A:
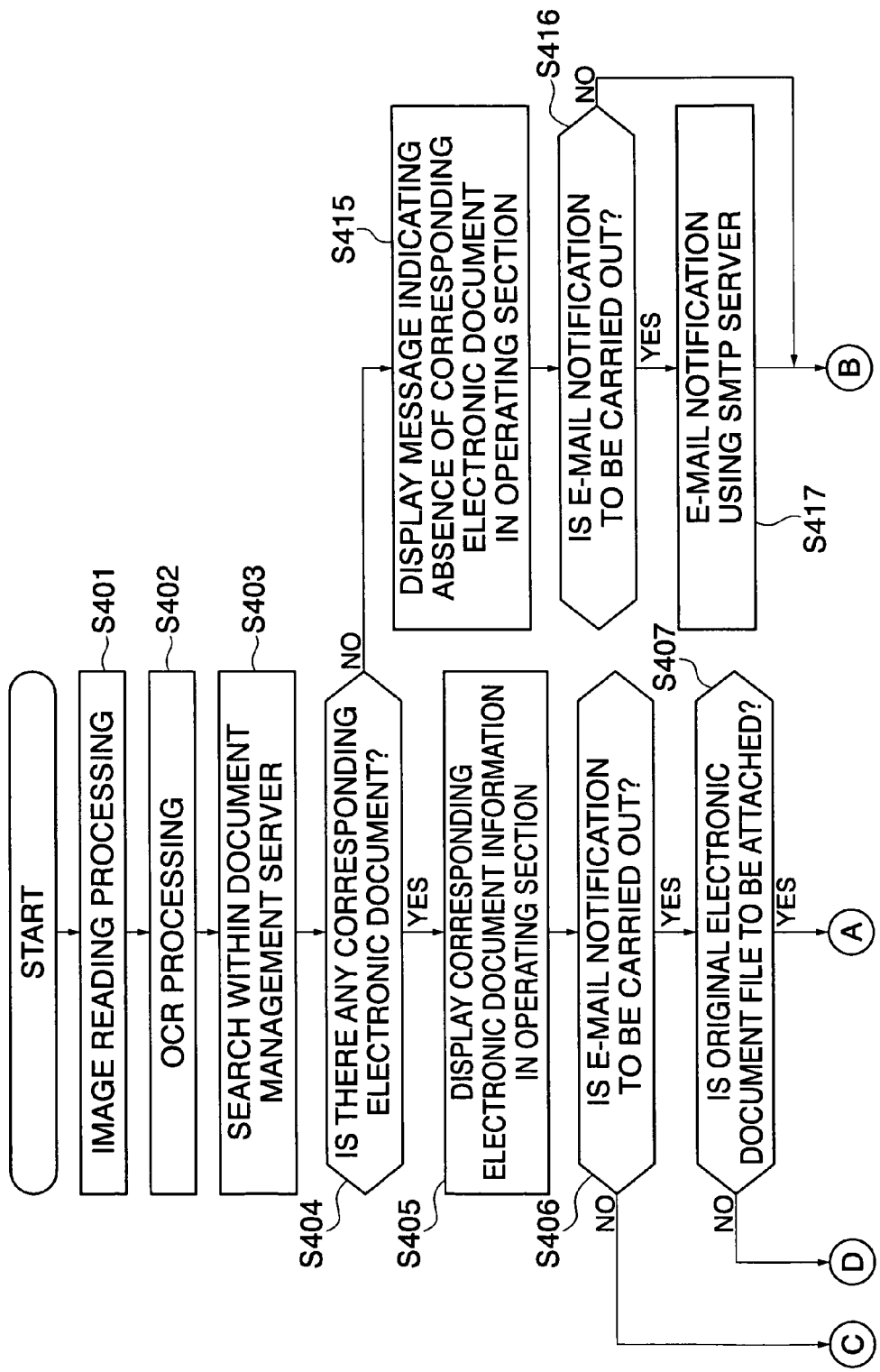

FIGS. 5A and 5B are flow chart showing an original electronic document data searching process carried out by the image input/output controller 105 in the document management system 10 of FIG. 1

After an original electronic document data search mode is set by pressing the search key 302 in the operating section 102 of the digital copying machine 100, the original electronic document data searching process in FIGS. 5A and 5B is started by placing a printed material to be searched for in the reader section 103 and depressing the copy key 306.

First, in a step S401, the reader section 103 starts reading an original image. Image data corresponding to the original image is output to the image input/output controller 105, and then temporarily stored in the hard disk 109 or the image storage memory 110 under the control of the controller 106.

Next, in a step S402, the read original image data is sent to the OCR section 111 and subjected to OCR processing, so that text information is extracted. The text information extracted in the step S402 is sent to the document searching section 112, and the process proceeds to a step S403 wherein an electronic document corresponding to the text information is searched for through electronic document data within the document management server 140. Specifically, it is determined whether or not there is any electronic document corresponding to the text information of the original image data (step S404). If there is no electronic document corresponding to the text information on the original image data in the document management server 140, the process proceeds to a step S415 wherein a message to the effect that there is no corresponding electronic document is displayed on the display panel 316 of the operating section 102, and the process proceeds to a step S416.

In the step S416, it is determined whether or not a setting has been made such that the search result is to be notified by e-mail. If it is determined that a setting has been made such that the search result is not to be notified by e-mail, the process is terminated. On the other hand, if it is determined that a setting has been made such that the search result is to be notified by e-mail ("YES" to the step S416), the process proceeds to a step S417 wherein an e-mail message to the effect that there is no corresponding document is transmitted with a subject, a signature, and so forth added thereto to an address set in advance using the SMTP server 126, and then the process is terminated. FIG. 11 shows an example of the contents of the transmitted e-mail.

If it is determined in the step S404 that an electronic document (original electronic document) corresponding to the text information on the original image data is present within the document management server 140, the process proceeds to a step S405 wherein information indicative of the corresponding electronic document as shown in FIG. 6 is displayed on the display panel 316 of the operating section 102.

FIG. 6 is a view showing an example of a screen on the display panel 316 of the operating section 102, which displays the result of the search for original electronic document data in the step S405 in FIG. 5A. In FIG. 6, reference numeral 420 denotes a window which shows a list of corresponding electronic document data. A display section 421 shows information indicative of where one or more corresponding electronic document data files are stored within the document management server 140. Although only one corresponding electronic document data is shown in FIG. 6, this is not limitative, but when a plurality of electronic document data correspond to text information of original image data, files of the plurality of electronic document data are shown in an order beginning from the one considered closest. Here, electronic document data considered closest means electronic document data which is likely to correspond to original image data with the highest possibility. A button 422 is for scrolling the displayed screen upward; a button 423 is for scrolling the displayed screen downward. A button 424 is touched for transmitting displayed information as an e-mail notification with no attached file. A button 425 is touched for transmitting displayed information as an e-mail notification with an attached file. A button 426 is touched for printing a selected electronic document file. A button 427 is touched for storing data expanded by rendering a selected electronic document file in a box within the hard disk 109. The user touches the screen to select an electronic document data file which he/she wishes to operate, and then touches any of the buttons 424 to 427 so as to execute any of the above described functions. When the user depresses an OK button 428, the window 420 showing a list of corresponding electronic document data is closed to display an immediately preceding screen.

The process then proceeds to a step S406. By touching a button displayed on the display panel 316 in the step S406, the user can manually execute e-mail notification, printing, storage in a box, and so forth. In the step S406, it is determined whether or not a setting has been made such that e-mail notification is to be carried out or not. If it is determined that a setting has been made such that e-mail notification is not to be carried out, the process proceeds to a step S410.

If it is determined in the step S406 that a setting has been made such that e-mail notification is to be carried out, the process proceeds to a step S407 wherein it is determined whether a setting has been made such that an original electronic document data file is to be attached to an e-mail or not. If it is determined that a setting has been made such that an original electronic document data file is not to be attached to an e-mail, the process proceeds to a step S409. If it is determined in the step S407 that a setting has been made such original electronic document data file is to be attached to an e-mail, the process proceeds to a step S408 wherein the corresponding original electronic document data file is obtained from the document management server 140 by file-transfer using the FTP controller 124, and is temporarily stored in the hard disk 109 under the control of the controller 106. The process then proceeds to the step S409.

In the step S409, if there is a file to be attached, notification is carried out by transmitting an e-mail with the file attached thereto and with a subject, a signature, and so forth added thereto to a preset address using the SMTP server 126. FIG. 9 shows an example of the contents of the transmitted e-mail.

Next, in the step S410, it is determined whether or not the original electronic document data is to be automatically printed. If it is determined that the original electronic document data is not to be automatically printed or not, the process proceeds to a step S411 wherein the document management server 140 is instructed to cause the digital multi-function machine 100 to print the original electronic document data. In a step S412, in the digital multi-function machine 100 having received print data from the document management server 140 via the network 115, the LPD controller 127 processes the print data, and prints the print data in the same manner as normal print data under the control of the controller 106.

Next, in a step S413, it is determined whether or not the data is to be stored in a box in the hard disk 109. If it is determined that the data is not to be stored in a box in the hard disk 109, the process proceeds to a step S414 wherein the print data obtained by rendering during execution of the step S412 is stored in a box within the hard disk 109. The process is then terminated. As a result, the user can perform reprinting or the like later using the data stored in the box.

In the above described original electronic document searching process, the following settings can be made:

1. a setting to notify a search result by e-mail;
2. a setting to attach an original electronic document file to an e-mail transmitted for notification;
3. a setting to carry out automatic printing of the corresponding document; and
4. a setting to store image data obtained by rendering in a box.

The above four settings can be made by the following three methods:

A: a method using the operating section 102 of the digital multi-function machine 100;

B: a method using a dedicated environmental setting application operating on the host computer 130; and C: a method using management software (the assignee) of the present invention uses a model "Remote UI" for his digital multi-function machine; hereinafter simply referred to as the "Remote UI") operating on a browser of the host computer 130. A description will now be given of the method C with reference to FIG. 7 while description of the above methods A and B is omitted.

Figure 7:
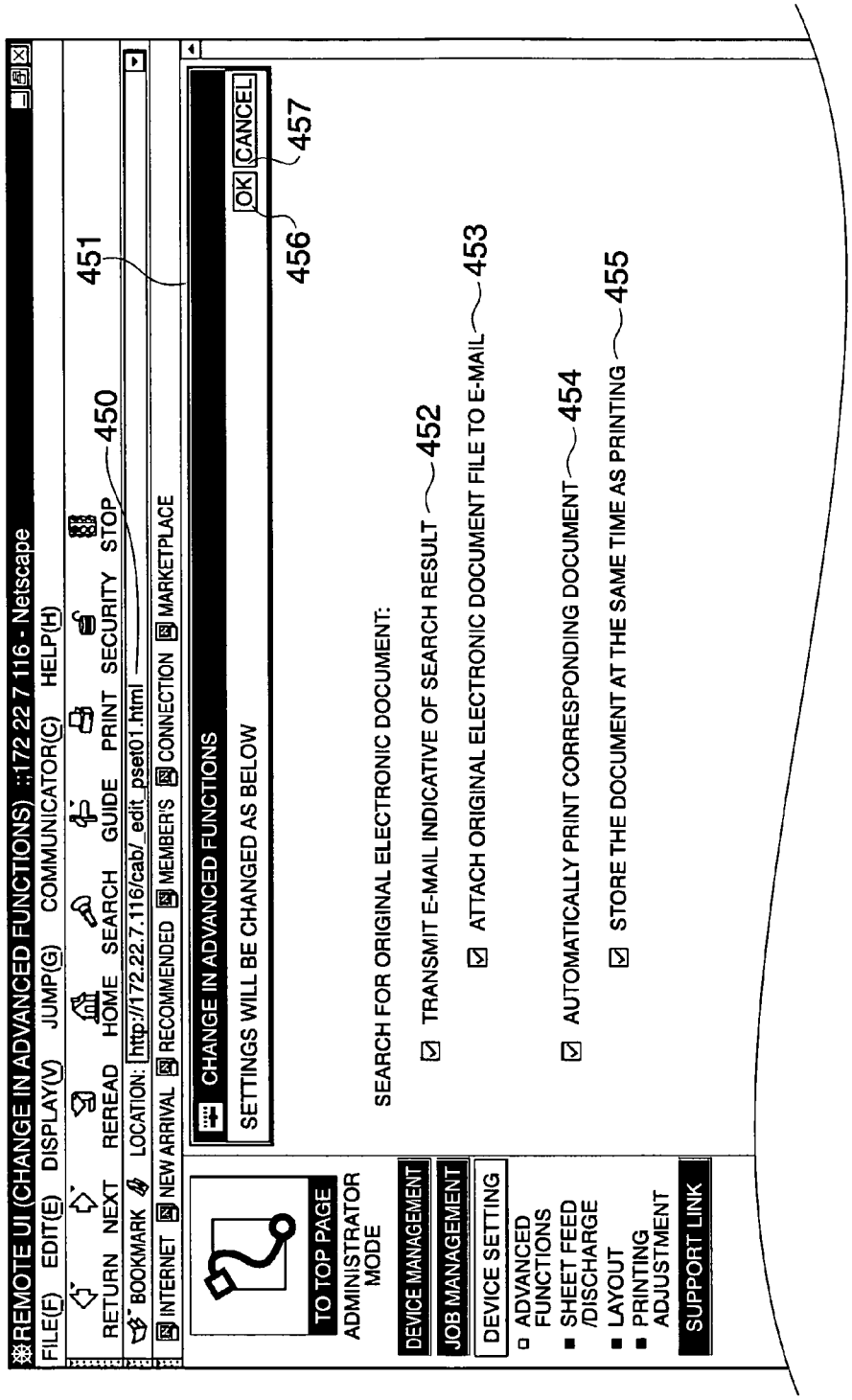
FIG. 7 is a view showing an example of a screen displayed on a browser in the case where a setting is made using management software "Remote UI" in a method C.

FIG. 7 is a view showing an example of a screen displayed on the browser in the case where a setting is made using the management software "Remote UI" in the method C.

The Remote UI is operated by sending and receiving an HTTP file, which can be displayed on the browser, to and from the host computer 130 using the Web server 122 of the computer interface section 108, and items on the screen can be operated using input devices such as a mouse and a keyboard, not shown. In FIG. 7, the operation of the Remote UI is started by designating an IP address (in this example, 172.22.7.116) of the digital multi-function machine 100 in a text box 450, and a remote UI screen 451 is displayed. Selecting device setting and advanced function setting displays the screen in FIG. 7. Further, an address displayed once is stored as a bookmark so that it can be called up later for use.

Reference numeral 452 denotes a check box for making a setting as to whether a search result is to be notified by e-mail or not. As shown in FIG. 7, checking the check box 452 makes a setting such that a search result is to be notified by e-mail. Similarly, reference numeral 453 denotes a check box for making a setting as to whether an original electronic document file is to be attached to an e-mail or not. Reference numeral 454 denotes a check box for making a setting as to whether the digital multi-function machine 100 is to carry out automatic printing using corresponding original electronic data. Reference numeral 455 denotes a check box for making a setting as to whether image data obtained by rendering is to be stored in a box in the hard disk 109 at the same time when printed. Depressing an OK button 456 after changing settings as desired fixes the present setting and restores an immediately preceding state. Depressing a cancel button 457 cancels the setting to restore an immediately preceding state.

Due to the use of the Remote UI as above, it is possible to display various settings and conditions of the digital multi-function machine 100 by operation on the host computer 130 insofar as there is any operating browser even if no dedicated application is installed into the host computer 130.

The following settings can be made when the result of search for original electronic document data is notified to the user:

1. the number of retransmissions when e-mail notification has failed;
2. the retransmission time interval when e-mail notification has failed;
3. an address to which an e-mail notification is to be sent;
4. a reply-to address;
5. a subject; and
6. a signature.

The above settings can be made by the following three methods:

A. a method using the operating section 102 of the digital multi-function machine 100;

B: a method using a dedicated environmental setting application operating on the host computer; and C: a method using the Remote UI operating on a browser of the host computer 130.

A description will hereafter be given of the method C while description of the setting methods A and B is omitted.

Figure 8:
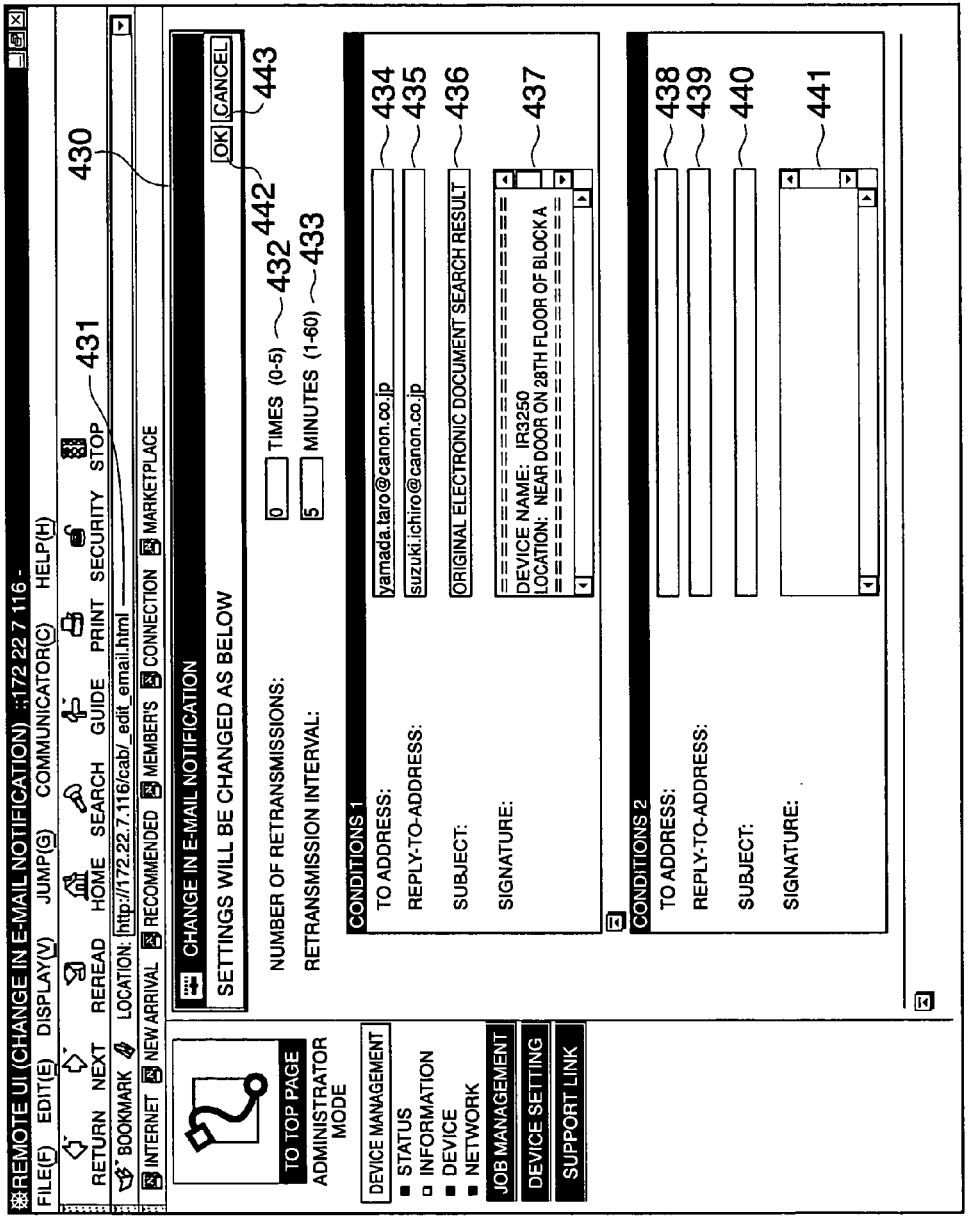
FIG. 8 is a view showing another example of a screen displayed on a browser in the case where a setting is made using the management software "Remote UI" in the method C.

FIG. 8 is a view showing another example of a screen displayed on the browser in the case where a setting is made using the management software "Remote UI" in the method C.

The operation of the Remote UI is started by specifying an IP address (in this example, 172.22.7.116) of the digital multi-function machine 100 in a text box 431, and then a remote UI screen 430 is displayed. Selecting "Device Management" and "Information" displays the screen in FIG. 8. Further, an address displayed once may be stored as a bookmark so that it can be called up later for use. In FIG. 8, reference numeral 432 denotes a text box for setting the number of retransmissions when e-mail notification has failed. Reference numeral 433 denotes a text box for setting the retransmission interval in minutes when e-mail notification has failed. Reference numeral 434 denotes a text box for setting an address to which an e-mail notification is to be sent. Reference numeral 435 denotes a text box for setting a reply-to address. Reference numeral 436 denotes a text box for setting the subject of an e-mail. Reference numeral 437 denotes a text box for setting a signature which is added to the last of an e-mail. In text boxes 438 to 441, the same items can be set as in the respective text boxes 434 to 437, so that two kinds of e-mail notifications can be set at the same time. Depressing an OK button 442 after changing settings as desired fixes the present setting and restores the immediately preceding state. Depressing a cancel button 443 cancels the setting to restore an immediately preceding state.

FIGS. 9 to 11 are views showing examples of contents of e-mails intended for notifying the result of search for original electronic document data.

FIG. 9 is a view showing an example of the contents of an e-mail notification in the case where the result of a search for original electronic document data shows that document data corresponds to original image data and a setting has been made such that original electronic document data is to be attached to an e-mail.

In FIG. 9, reference numeral 461 denotes a sender's e-mail address, and reference numeral 462 denotes a recipient's e-mail address set in the text box 434 or 438 in FIG. 8. Reference numeral 463 denotes a subject set in the text box 436 or 440 in FIG. 8. Reference numeral 464 denotes the date of e-mail transmission. Reference numeral 465 denotes a location where an electronic document data file corresponding to an original image is stored in the document management server 140. Reference numeral 466 denotes a signature set in the text box 437 or 441 in FIG. 8 and inserted in an e-mail. Reference numeral 467 denotes an electronic document data file corresponding to an original image and attached to an e-mail.

FIG. 10 is a view showing an example of the contents of an e-mail notification in the case where the result of a search for original electronic document data shows that three document data corresponds to original image data and a setting has been made such that original electronic document data is not to be attached to an e-mail.

In FIG. 10, reference numeral 471 denotes a sender's e-mail address, and reference numeral 472 denotes a recipient's e-mail address set in the text box 434 or 438 in FIG. 8. Reference numeral 473 denotes a subject set in the text box 436 or 440 in FIG. 8. Reference numeral 474 denotes the date of e-mail transmission. Reference numerals 475, 476, and 477 denote locations where corresponding three electronic document data files are stored in the document management server 140, in which the displayed three electronic document data files are arranged from the top in descending order of the degree of correspondence. Reference numeral 478 denotes a signature set in the text box 437 or 441 in FIG. 8 and inserted in an e-mail. No file is attached to an e-mail shown in FIG. 10.

FIG. 11 is a view showing an example of the contents of an e-mail notification in the case where the result of a search for original electronic document data shows that there is no electronic document data corresponding to original image data.

In FIG. 11, reference numeral 481 denotes a sender's e-mail address, and reference numeral 482 denotes a recipient's e-mail address set in the text box 434 or 438 in FIG. 8. Reference numeral 483 denotes a subject set in the text box 436 or 440 in FIG. 8. Reference numeral 484 denotes the date of e-mail transmission. Reference numeral 485 denotes a message to the effect that no corresponding document has been found as a result of search for original electronic document data. Reference numeral 486 denotes a signature set in the text box 437 or 441 in FIG. 8 and inserted in an e-mail. No file is attached to an e-mail shown in FIG. 11.

A description will now be given of a second embodiment of the present invention.

In the above described first embodiment, original electronic data is searched for within the document management server 140 by performing OCR processing on original image data which has been read to extract text data.

The second embodiment is distinguished from the first embodiment in that it copes with a case where the original image has no text data and a case where the original image is identical in text data with its corresponding original electronic document data but is different in graphics, image, and so forth other than text data from the original electronic document data.

Figure 12:
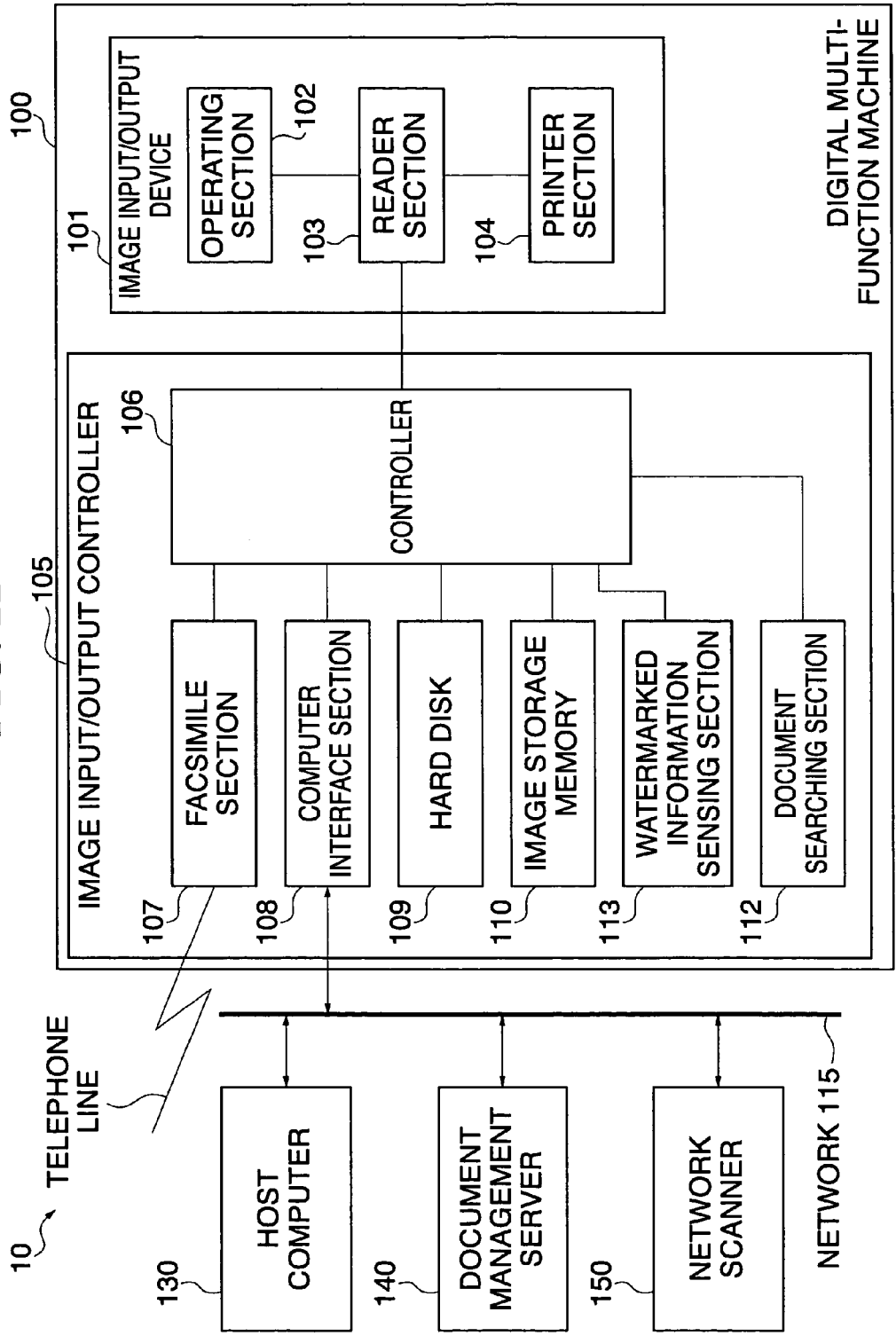
FIG. 12 is a block diagram showing the arrangement of a document management system according to a second embodiment of the present invention.

FIG. 12 is a block diagram showing the arrangement of the document management system according to the second embodiment.

In FIG. 12, the document management system 10 according to the present embodiment is different from the above described document management system according to the first embodiment only in that a watermarked information sensing section 113 is used in place of the OCR section 111 of the document management system 10 appearing in FIG. 1. In the drawings, elements and parts which are identical with those of the first embodiment are designated by identical reference numerals, and duplicate description thereof is omitted. It should be noted that the drawings other than FIGS. 1 and 2 referred to in the description of the document management system 10 according to the first embodiment also apply to the document management system 10 according to the present embodiment, and hence they will be referred to as needed.

In the document management system 10 according to the present embodiment, watermarked information data which enables electronic document data to be uniquely specified in the document management server 140 is added to the electronic document data when it is printed. When an image is read, the watermarked information data is sensed and used as information for document search. This increases the accuracy of determination as to the degree of correspondence between an original image and original electronic document data, and reduces the probability that electronic document data different from an original image is selected.

In printing electronic document data to be managed by the document management server 140, information which enables electronic document data which has been subjected to printing to be uniquely specified (for example, a file name, a file size, and the date of latest update) is printed as watermarked data on the print surface. The "watermarked data" means information embedded in such a form as to be invisible to the naked eye of the user, and is recognized by the watermarked information sensing section 113 so that it can be decoded and encoded.

The image data of an original read by the reader section 103 of the digital multi-function machine 100 is output to the image input/output controller 105, and is temporarily stored in the hard disk 109 or the image storage memory 110 under the control of the controller 106. The read image data is subjected to watermarked information sensing processing by the watermarked information sensing section 113, so that watermarked information is extracted.

The document searching section 112 is capable of searching electronic document data corresponding to the read original through electronic data files within the document management server 140 according to a file name, a file size, the date of last update, and so forth indicated by the watermarked information extracted by watermarked information sensing processing.

If there is electronic document data corresponding to the original in the document management server 140, the controller 106 displays information indicative of a location of the electronic document data on the display panel 316 (refer to FIG. 3) of the operating section 103. The user gives an instruction by touching a key displayed on the display panel so as to send a notification of the search result by e-mail to an address registered in advance in the digital multi-function machine 100, cause the document management server 140 to instruct the digital multi-function machine 100 to print information indicative of the search result, or register information indicative of the search result as image information in a box within the hard disk 109 of the digital multi-function machine 100. It should be noted that making settings using the operating section 102 of the digital multi-function machine 100 or the Remote UI, described later, can set in advance the e-mail notification, execution of printing, and execution/non-execution of storage in a box so that the settings can be automatically executed.

Figure 13A:
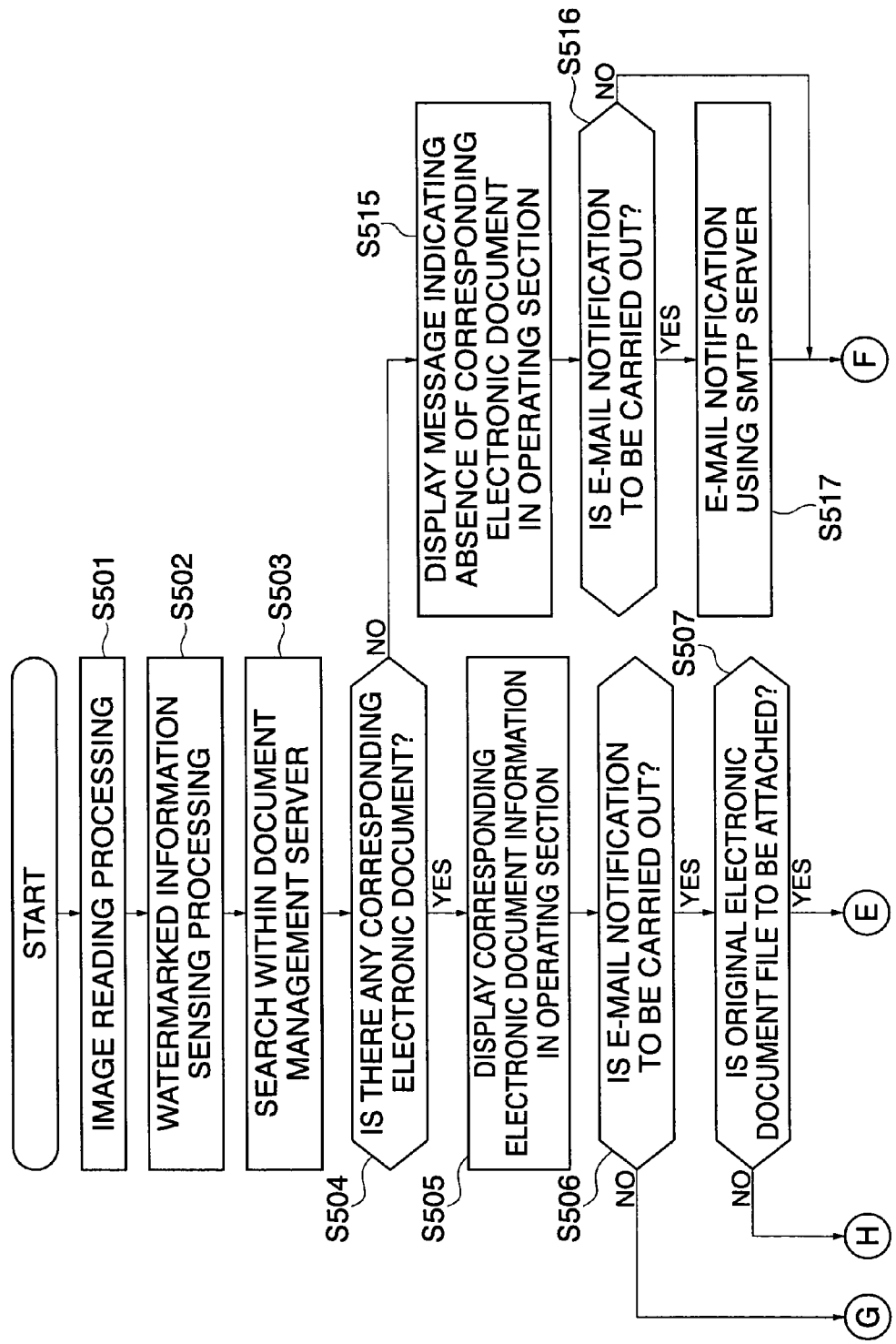

FIGS. 13A and 13B are flow chart showing an original electronic document data searching process carried out by an image input/output controller 105 of the document management system 10 of FIG. 12.

After switching to an original electronic document data search mode by depressing the search key 302 in the operating section 102 of the digital multi-function machine 100, a printed material which is to be subjected to searching is placed in the reader section 103. Then, the original electronic document data searching process is started by depressing the copy key 306.

First, in a step S501, the reader section 103 starts carrying out original image reading processing. The image data corresponding to an original image is output to the image input/output controller 105, and is temporarily stored in the hard disk 109 or the image storage memory 110 under the control of the controller 106.

Next, in a step S502, the read original image data is transmitted to the watermarked information sensing section 113, so that watermarked information sensing processing is carried out to extract watermarked information data. The watermarked information data extracted in the step S502 is sent to the document searching section 112, and in a step S503, electronic document corresponding to the watermarked information data is searched for through electronic document data stored in the document management server 140. Next, it is determined whether or not there is any electronic document corresponding to the watermarked information data of the original image data (step S504). If it is determined that there is no electronic document corresponding to the watermarked information data of the original image data, the process proceeds to a step S515 wherein a message to the effect that there is no corresponding electronic document is displayed on the display panel 316. The process proceeds to a step S516.

In the step S516, it is determined whether a setting has been made such that e-mail notification is to be carried out or not. If it is determined that a setting has been made such that e-mail notification is not to be carried out, the process is terminated. If it is determined that a setting has been made such that e-mail notification is to be carried out ("YES" to the step S516), the process proceeds to a step S517 wherein a message to the effect that there is no corresponding electronic document is transmitted as an e-mail with a subject, a signature, and so forth added thereto to an address set in advance using the SMTP server 126 (refer to FIG. 4), and then the process is terminated. FIG. 11 shows an example of the contents of the e-mail transmitted for notification.

If it is determined in the step S504 that there is any electronic document corresponding to the original image data, i.e. any corresponding electronic document (original electronic document data) in the document management server 140, the process proceeds to a step S505 wherein information indicative of the corresponding electronic document as shown in FIG. 6 is displayed on the display panel 316 of the operating section 102, and the process proceeds to a step S506.

Touching a button displayed on the display panel 316 in the step S506 can execute e-mail notification, printing, storage in a box, or the like. In the step S506, it is determined whether a setting has been made such that e-mail notification is to be carried out or not. If it is determined that e-mail notification is not to be carried out, the process proceeds to a step S510.

If it is determined in the step S506 that e-mail notification is to be carried out, the process proceeds to a step S507 wherein it is determined whether a setting has been made such that an original electronic document data file is to be attached to an e-mail or not. If it is determined that a setting has been made such that an original electronic document data file is not to be attached to an e-mail, the process proceeds to a step S509. If it is determined in the step S507 that a setting has been made such that an original electronic document data file is to be attached to an e-mail, the process proceeds to a step S508 wherein a corresponding original electronic document data file is obtained by file-transfer using the FTP controller 104 from the document management server 140. The obtained corresponding original electronic document data file is temporally stored in the hard disk 109 under the control of the controller 106, and the process then proceeds to the step S509.

In the step S509, if there is a file to be attached, a search result notification is transmitted as an e-mail with the file being attached and a subject, a signature, and so forth added thereto to an address set in advance. The transmitted e-mail notification has contents as shown in FIG. 9.

In the next step S510, it is determined whether or not the original electronic document data is to be automatically printed. If it is determined in the step S510 that the original electronic document data is not to be automatically printed, the process is terminated. If it is determined in the step S510 that the original electronic document data is to be automatically printed, the process proceeds to a step S511 wherein the document management server 140 is instructed to cause the digital multi-function machine 100 to print the original electronic document data. In a step S512, in the digital multi-function machine 100 which has received the print data from the document management server 140 via the network 115, the print data is subjected to processing by the LPD controller 127 and is printed in the same manner as normal print data under the control of the controller 106.

Next, in a step S513, it is determined whether or not the search result is to be stored in a box within the hard disk 109. If it is determined in the step S513 that the search result is to be stored in a box within the hard disk 109, the process proceeds to a step S514 wherein the print data obtained by rendering during execution of the step S512 is stored in a box within the hard disk 109. The process is then terminated. As a result, the user can reprint the search result later using the data stored in the box.

It should be noted that "display of the search result in the operating section", "how to make various settings in search for original electronic document", "various settings as to e-mail notification", and "contents of an e-mail to be transmitted for notification" are similar to those according to the first embodiment, and hence description thereof has been omitted.

It is to be understood that the object of the present invention may also be accomplished by supplying a system or an apparatus with a storage medium (or a recording medium) in which a program (the flow chart of FIGS. 5A and 5B or 13A and 13B) of software, which realizes the functions of either of the above described embodiments is stored, and causing a computer (or CPU or MPU) of the system or apparatus to read out and execute the program stored in the storage medium.

In this case, the program code is supplied directly from a storage medium storing the program, or is supplied by downloading from another computer, a database, or the like, not shown, connected to the Internet, a commercial network, a local area network, or the like.

The form of the program may be an object code, a program code executed by an interpreter, or script data supplied to an OS (Operating System).

Further, it is to be understood that the object of the present invention may also be accomplished by supplying a computer or a CPU with a storage medium in which a program code of software which realizes the functions of either of the above described embodiments is stored, and causing the computer or the CPU to read out and execute the program code stored in the storage medium.

In this case, the program code itself read from the storage medium realizes the functions of either of the above described embodiments, and hence the program code and a storage medium on which the program code is stored constitute the present invention.

Examples of the storage medium for supplying the program code include a ROM, a RAM, an NV-RAM, a floppy (registered trademark) disk, a hard disk, an optical disk (registered trademark), a magneto optical disk, a CD-ROM, an MO, a CD-R, a CD-RW, a DVD-ROM, a DVD-RAM; a DVD-RW, a DVD+RW, a magnetic tape, and a nonvolatile memory card. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

What is claimed is:

1. A document management system comprising:
a host computer;
an image information processing apparatus;
a document management server that manages electronic document data; and
a network that connects said host computer, said image information processing apparatus, and said document management server to each other,
wherein said image information processing apparatus comprises:
an image information reading device that reads image information;
a searching device that searches the electronic document data within said document management server for an original electronic document data file corresponding to the read image information;
a setting device that sets in advance, based on a user operation, whether or not the searched original electronic document data file is to be attached to an electronic mail notification and whether or not the electronic mail notification is automatically executed; and
an operating section that displays a result of a search by said searching device, including a first button for transmitting the result of the search as an electronic mail notification with the searched original electronic document data file and a second button for transmitting the result of the search as an electronic mail notification without the searched original electronic document data file;
a notifying device that transmits the result of the search by said searching device as an electronic mail to an electronic mail address when said setting device sets that the electronic mail notification is automatically executed or when one of the first or second button displayed in said operating section is operated by a user even if said setting device sets that the electronic mail notification is not automatically executed, the result of search including information indicative of a location where the searched original electronic document data is stored,
wherein the searched original electronic document data file is attached to the electronic mail to be transmitted file by said notifying device when said setting device sets that the searched original electronic document data file is to be attached or when the first button is operated by the user, and
wherein no file corresponding to the searched original electronic document data file is attached to the electronic mail to be transmitted by said notifying device when said setting device sets that the searched original electronic document data file is not to be attached or when the second button is operated by the user.

2. A document management system according to claim 1, wherein said searching device comprises a character recognition device.

3. A document management system according to claim 1, wherein said searching device comprises a watermarked information sensing device.

4. A document management system according to claim 1, wherein said notifying device displays the result of search in said operating section.

5. A document management system according to claim 1, wherein in a case where a plurality of original electronic document files corresponding to the read image information are searched out, the result of search includes correspondence information indicative of priorities assigned to the plurality of original electronic document files according to degrees of correspondence.

6. A document management system according to claim 1, wherein said image information processing apparatus further comprises:
a printing device;
a controller operable when the original electronic document data file corresponding to the read image information is present within said document management server, to cause said printing device to print the original electronic document data file.

7. A document management system according to claim 1, wherein said image information processing apparatus further comprises:
a storage device; and
a controller operable when the original electronic document data file corresponding to the electronic document data within the read image information is present within said document management server, to provide control to store data obtained by rendering the original electronic document data in said storage device.

8. A document management method of operating an image information processing apparatus having an operating section connected via a network to a document management server which manages electronic document data, the method comprising:
an image information reading step of reading image information;
a searching step of searching the electronic document data within the document management server for an original electronic document data file corresponding to the read image information;
a setting step of setting in advance, based on a user operation, whether or not the searched original electronic document data file is to be attached to an electronic mail notification and whether or not the electronic mail notification is automatically executed; and
a displaying step of displaying in the operation section a result of a search from said searching step, the operation section including a first button for transmitting the result of the search as an electronic mail notification with the searched original electronic document data file and a second button for transmitting the result of the search as an electronic mail notification without the searched original electronic document data file;
a notifying step of transmitting the result of the search in said searching step as an electronic mail to an electronic mail address when said setting step sets that the electronic mail notification is automatically executed or when one of the first or second button displayed in said operating section is operated by a user even if said setting step sets that the electronic mail notification is not automatically executed, the result of search including information indicative of a location where the searched original electronic document data is stored, wherein the searched original electronic document data file is attached to the electronic mail to be transmitted in said notifying step when said setting step sets that the searched original electronic document data file is to be attached or when the first button is operated by the user, and wherein no file corresponding to the searched original electronic document data file is attached to the electronic mail to be transmitted in said notifying step when said setting step sets that the searched original electronic document data file is not to be attached or when the second button is operated by the user.

9. A computer-readable storage medium storing a computer program for causing a computer to execute a document management method of operating an image information processing apparatus having an operating section connected via a network to a document management server which manages electronic document data, the method comprising:

an image information reading step of reading image information;

a searching step of searching the electronic document data within the document management server for an original electronic document data file corresponding to the read image information;

a setting step of setting in advance, based on a user operation, whether or not the searched original electronic document data file is to be attached to an electronic mail notification and whether or not the electronic mail notification is automatically executed; and a displaying step of displaying in the operating section a result of a search from said searching step, the operating section including a first button for transmitting the result of the search as an electronic mail notification with the searched original electronic document data file and a second button for transmitting the result of the search as an electronic mail notification without the searched original electronic document data file;

a notifying step of transmitting the result of the search in said searching step as an electronic mail to an electronic mail address when said setting step sets that the electronic mail notification is automatically executed or when one of the first or second button displayed in said operating section is operated by a user even if said setting step sets that the electronic mail notification is not automatically executed, the result of search including information indicative of a location where the searched original electronic document data is stored, wherein the searched original electronic document data file is attached to the electronic mail to be transmitted in said notifying step when said setting step sets that the searched original electronic document data file is to be attached or when the first button is operated by the user, and wherein no file corresponding to the searched original electronic document data file is attached to the electronic mail to be transmitted in said notifying step when said setting step sets that the searched original electronic document data file is not to be attached or when the second button is operated by the user.

10. An document management system according to claim 1, wherein the user operation is executed via a web browser of an external computer that is connected via the network to the image information processing apparatus.

11. An image information processing apparatus connected via a network to a document management server that manages electronic document data, the image information processing apparatus comprises:

a searching unit that searches the electronic document data within said document management server for an original electronic document data file corresponding to image information read by an reading unit;

a setting unit that sets in advance, based on a user operation, whether or not the searched original electronic document data file is to be attached to an electronic mail notification and whether or not the electronic mail notification is automatically executed;

an operating unit that displays a result of a search by said searching unit, including a first button for transmitting the result of the search as an electronic mail notification with the searched original electronic document data file and a second button for transmitting the result of the search as an electronic mail notification without the searched original electronic document data file;

a transmitting unit that transmits the result of the search by said searching unit as an electronic mail to an electronic mail address when said setting unit sets that the electronic mail notification is automatically executed or when one of the first or second button displayed in said operating unit is operated by a user even if said setting unit sets that the electronic mail notification is not automatically executed, the result of search including information indicative of a location where the searched original electronic document data is stored, wherein the searched original electronic document data file is attached to the electronic mail to be transmitted by said transmitting unit when said setting unit sets that the searched original electronic document data file is to be attached or when the first button is operated by the user, and wherein no file corresponding to the searched original electronic document data file is attached to the electronic mail to be transmitted by said transmitting unit when said setting unit sets that the searched original electronic document data file is not to be attached or when the second button is operated by the user.

* * * * *